(12) United States Patent  (10) Patent No.: US 7,719,622 B2
Lim  (45) Date of Patent: May 18, 2010

(54) LIQUID CRYSTAL DISPLAY DEVICE AND METHOD OF MANUFACTURING THE SAME

(75) Inventor: Byoung Ho Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 320 days.

(21) Appl. No.: 11/288,306

(22) Filed: Nov. 29, 2005

(65) Prior Publication Data

US 2006/0146210 A1  Jul. 6, 2006

(30) Foreign Application Priority Data

Dec. 30, 2004 (KR) ............. 10-2004-0116346

(51) Int. Cl.
 *G02F 1/1343* (2006.01)
(52) U.S. Cl. .......................... 349/38; 349/39; 349/141; 349/187
(58) Field of Classification Search ............... 349/141, 349/39, 38, 187
See application file for complete search history.

(56) References Cited

U.S. PATENT DOCUMENTS

| 6,791,651 B2 * | 9/2004 | Jo et al. ............. 349/141 |
| 7,199,846 B2 * | 4/2007 | Lim ............. 349/43 |
| 7,289,180 B2 * | 10/2007 | Kim et al. ............. 349/141 |
| 7,428,032 B2 * | 9/2008 | Yoo et al. ............. 349/138 |
| 2002/0171796 A1 * | 11/2002 | Kim ............. 349/141 |
| 2003/0128323 A1 * | 7/2003 | Matsumoto et al. ......... 349/141 |
| 2004/0257511 A1 * | 12/2004 | Song et al. ............. 349/141 |
| 2007/0026556 A1 * | 2/2007 | Kitagawa et al. ............. 438/30 |

* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

An LCD include a gate line, a first data line and a second data line arranged to cross each other, thereby defining a unit pixel region, a TFT disposed at a region where the gate line, the first data line and the second data line cross, and having a passivation layer on an exposed channel layer, a common line disposed in parallel to the gate line, a first storage electrode integrally formed with the common line for forming a storage capacitance in the unit pixel region, a second electrode disposed to overlap with the first storage electrode, common electrodes branched from the first storage electrode and disposed at the unit pixel region, and pixel electrodes branched from the second storage electrode and alternately disposed with the common electrodes.

14 Claims, 7 Drawing Sheets

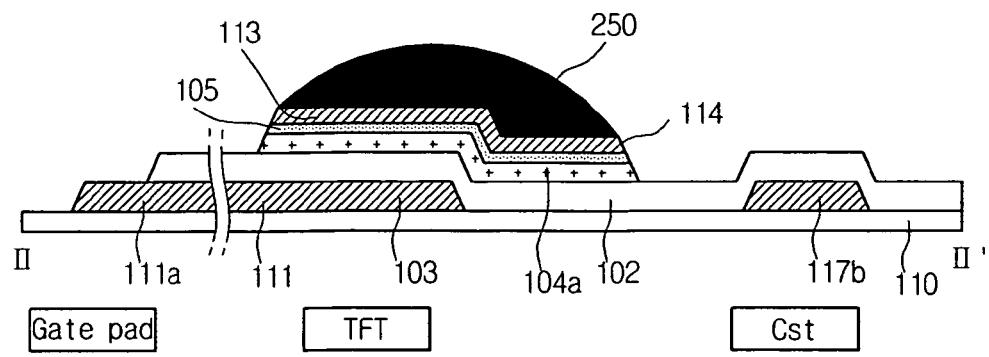
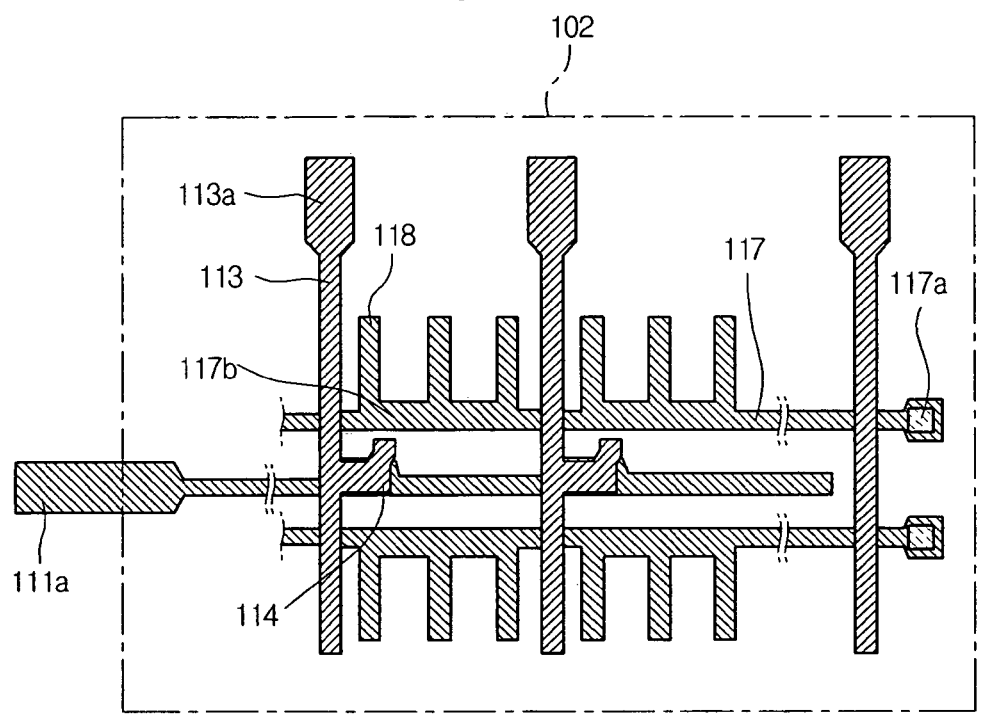

LIQUID CRYSTAL DISPLAY DEVICE AND METHOD OF MANUFACTURING THE SAME

This application claims the benefit of Korean Patent Application No. 10-2004-0116346 filed on Dec. 30, 2004, which is hereby incorporated by reference for all purposes as if fully set forth herein.

BACKGROUND OF THE INVENTION

1. Field of the Invention

The present invention relates to a liquid crystal display device and a method of manufacturing the same, and more particularly, to a liquid crystal display device and a method of manufacturing the same, capable of reducing processes required to manufacture an LCD and capable of obtaining a storage capacitance, thereby providing an improved display quality.

2. Description of the Related Art

A liquid crystal display module is gaining importance as an information display device. A cathode ray tube (CRT) has advantages in performance and has been widely used until now. However, the CRT display device also has disadvantages in miniaturization and portability.

In order to overcome such disadvantages of the CRT, a liquid crystal display device (LCD) has been introduced. The LCD has many advantages such as being light, thin, and small, and having a high brightness and a large screen. The LCD also has low power consumption and a low price.

The LCD has a superior display resolution compared with other flat panel display devices and has a fast response speed compared with the CRT when a moving image is displayed.

LCD technology has been studied to develop an LCD to overcome a narrow viewing angle, and various schemes have been introduced such as an in-plan switching mode (IPS) and an optically compensated birefringence mode (OCB).

In the IPS mode LCD, two electrodes are formed on a same substrate, i.e., a bottom substrate. An electric field is generated in a horizontal direction with respect to the substrate as two electrodes supply a voltage therebetween in order to drive liquid crystal molecules horizontally from the substrate.

Therefore, in the IPS mode, a major axis of a liquid crystal molecule is not raised in a vertical direction with respect to a substrate, as in a twisted nematic (TN) mode.

As a result, the IPS mode LCD has a superior viewing angle compared with a TN mode LCD because the IPS mode LCD has a small variation of birefringence index of the liquid crystal according to the viewing angle.

The bottom substrate is generally called a thin film transistor (TFT) substrate, and the TFT substrate is manufactured using five to six mask processes. The number of mask processes directly relates to the manufacturing cost of the LCD. A method of manufacturing an LCD using four mask processes has also been used.

FIG. 1 is a plan view of an IPS mode LCD according to the related art.

As shown in FIG. 1, a unit pixel region is defined by a gate line 11 and the data line 13 which are arranged to cross each other. The gate line 11 receives a driving signal and the data line 13 receives data signals.

A common line 17 is arranged in parallel to the gate line 11 and is separated from the gate line 11 by a predetermined difference. A thin film transistor (TFT) is disposed as a switching element on a crossing region where the gate line 11 and the data line 13 cross.

In the unit pixel region, a plurality of common electrodes 18 is branched in a form of a slit, and a plurality of pixel electrodes 19 are alternately arranged with the common electrodes 18. The common electrodes 18 and the pixel electrodes 19 are separated by a predetermined distance.

The plurality of common electrodes 18 is arranged at a unit pixel region and extends from a first storage electrode 17b. The first storage electrode is integrally formed with the common line 17.

The pixel electrodes 19 extend from a second storage electrode 15, which is formed on the first storage electrode 17b to overlap with the first storage electrode 17b.

A gate pad 11a is formed at an edge of the gate line 11 and a gate contact pad 21 made of transparent metal is formed on the gate pad 11a.

A data pad 13a is formed at an edge of the data line 13 and a data contact pad 23 made of transparent metal is formed on the data pad 13a. A reference numeral 17a denotes a common pad.

FIGS. 2A through 2D are sectional views of FIG. 1 taken along a line I-I' for describing a method of manufacturing an LCD according to the related art.

Referring to FIG. 2A, a metal layer is deposited on an insulation substrate 10. The gate line 11, the gate pad 11a and the gate electrode 3 and the common line 17 are simultaneously formed by an etching process.

The common line 17 is used as the first storage electrode 17b to form a storage capacitance Cst in a unit pixel region as shown in FIG. 1.

After forming the gate line 11, a gate dielectric layer 2 is formed on the entire surface of the insulation substrate 10.

Then, an amorphous silicon layer 4, a doped amorphous silicon layer 5 and a metal layer 7 are sequentially formed on the insulation substrate 10 as shown in FIG. 2B.

A photoresist is coated on the entire surface of the insulation substrate 10, and a half tone pattern is formed using diffractive exposure.

As shown in FIG. 2C, two etching processes are performed along the half tone pattern to form a channel layer 4a, an ohmic contact layer 5a, a source/drain electrode 13, 14 and a data line 13, simultaneously.

As shown in FIG. 1, the source electrode 13 is not additionally patterned or etched, and the data line 13 at the crossing region of the gate line 11 is used as the source electrode 13.

When the TFT is formed on the insulation substrate 10, a passivation layer 9 is formed on the entire surface of the insulation substrate 10 as shown in FIG. 2D.

After forming the passivation layer 9, a contact hole process is performed to open a predetermined portion of the drain electrode 14, the gate pad 11a, the data pad 13a and the common pad 17b.

Then, a transparent metal is deposited on the insulation substrate 10, and the pixel electrode 19 and the second storage electrode 15 are integrally formed to overlap with the first storage electrode 17b.

A gate contact pad 21 and a data contact pad 23 are formed on the data pad 13a as shown in FIG. 1.

However, it is very difficult to obtain the storage capacitance Cst in the LCD shown in FIG. 1 because the gate insulating layer 2 and the passivation layer 9 are formed between the first storage electrode 17b and the second storage electrode 15.

If the storage capacitance Cst is not sufficiently obtained, as in the related art, display quality of the LCD is degraded. Accordingly, the distance between the first storage electrode 17b and the second electrode 15 must be very short to sufficiently obtain the storage capacitance Cst. Also, the number of mask processes needs to be reduced to reduce the manufacturing cost of the LCD.

SUMMARY OF THE INVENTION

Accordingly, the present invention is directed to a liquid crystal display device and a method of manufacturing the same that substantially obviates one or more of the problems due to limitations and disadvantages of the related art.

An advantage of the present invention is to provide an LCD and a method of manufacturing the same for reducing the number of mask processes and sufficiently obtaining a storage capacitance.

Another advantage of the present invention is to provide an LCD and a method of manufacturing the same for reducing the number mask processes so that the step difference of the electrodes may be minimized in order to reduce a light leakage defect.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, there is provided an LCD including a gate line, a first data line and a second data line arranged to cross each other, thereby defining a unit pixel region in which the first data line and the second data line are overlapped; a thin film transistor disposed at a crossing region where the gate line, the first data line and the second data line cross, and having a passivation layer on an exposed channel layer; a common line disposed in parallel to the gate line; a first storage electrode integrally formed with the common line for forming a storage capacitance in the unit pixel region; a second storage electrode disposed to overlap with the first storage electrode; common electrodes branched from the first storage electrode and disposed at the unit pixel region; and pixel electrodes branched from the second storage electrode and alternately disposed with the common electrodes.

In another aspect of the present invention, there is provided a method of manufacturing an LCD, including: a first mask process for forming a gate line, a gate pad, a gate electrode and a common line on an insulation substrate; a second mask process for sequentially forming a gate insulating layer, an amorphous silicon layer, a doped amorphous silicon layer and a metal layer on the insulation substrate in an area where the gate electrode is formed, and for forming a first data line and a channel layer through a halftone process; a third mask process for forming a transparent metal layer on the gate insulating layer in an area where the channel layer is formed, and for simultaneously forming a contact pad, a second data line, an electrode of a thin film transistor, an ohmic contact layer and a pixel electrode by an etching process; and a plasma process for forming a passivation layer on the channel layer of the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention. In the drawings:

FIG. 7A is a cross-section view of FIG. 3 taken along a line II-II' for illustrating part of a second mask process;

FIG. 7B is a plan view of FIG. 3 for illustrating part of a second mask process;

DETAILED DESCRIPTION OF THE INVENTION

Reference will now be made in detail to embodiments of the present invention, examples of which are illustrated in the accompanying drawings. Wherever possible, the same reference designations will be used throughout the drawings to refer to the same or similar parts.

Figure 1:
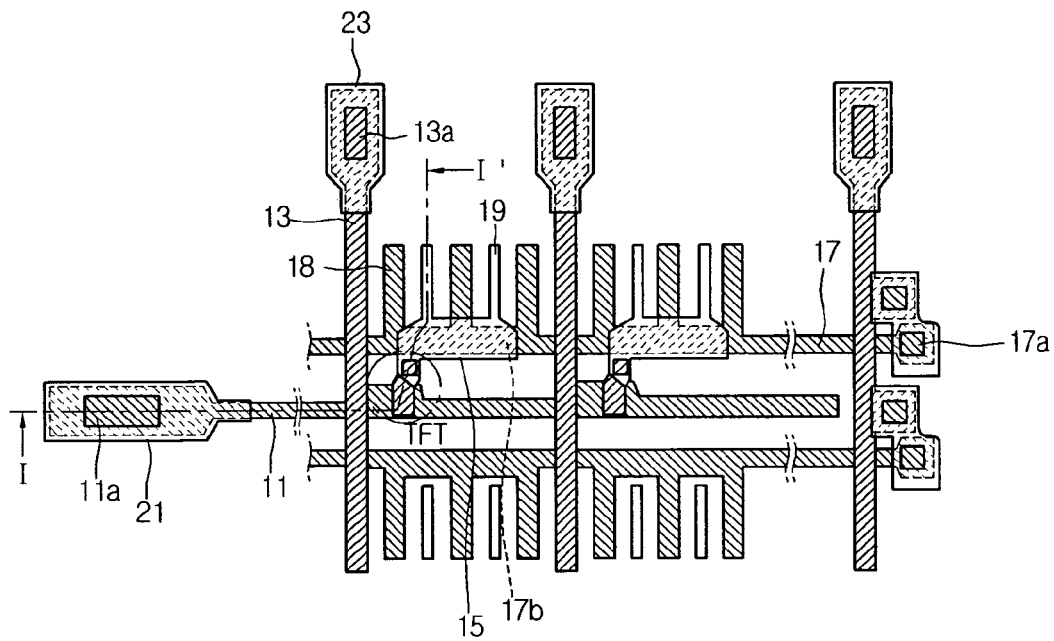
FIG. 1 is a plan view of an IPS mode LCD according to the related art.
Figure 2A:
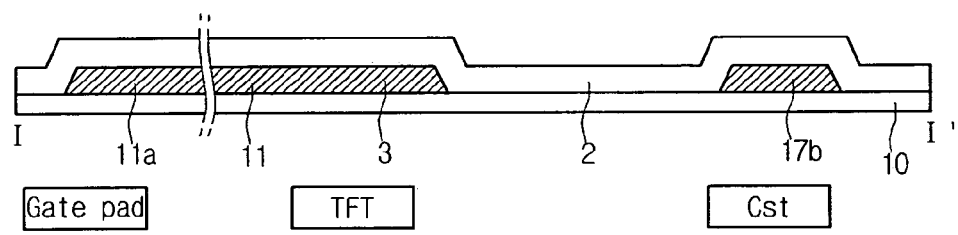
FIGS. 2A to 2D are sectional views of the IPS mode LCD of FIG. 1 taken along a line I-I' for illustrating a method of manufacturing an LCD according to the related art.
Figure 2B:
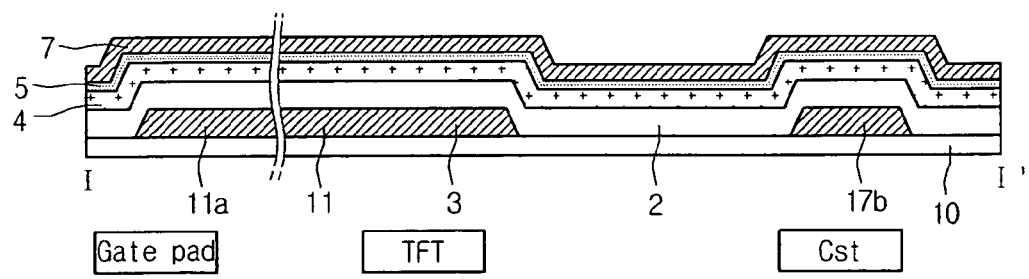
Figure 2C:
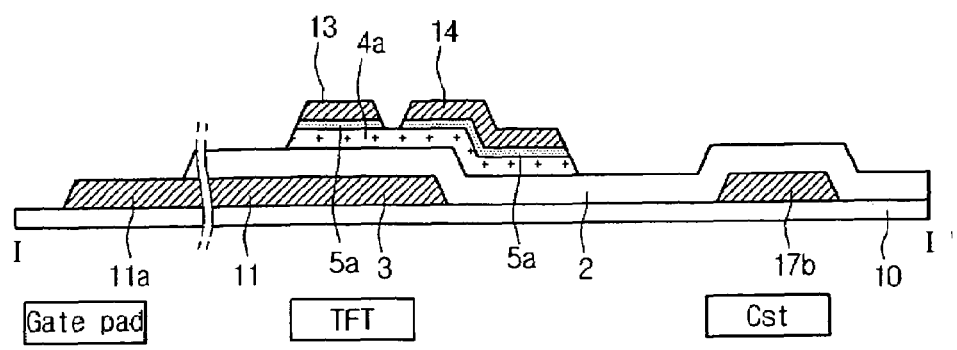
Figure 2D:
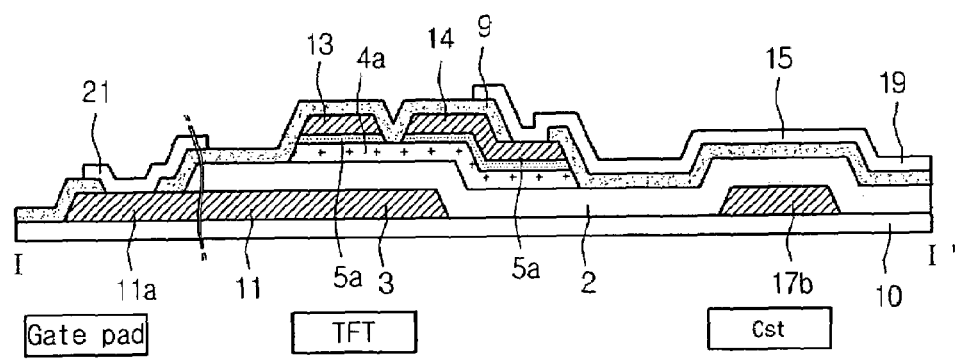
Figure 3:
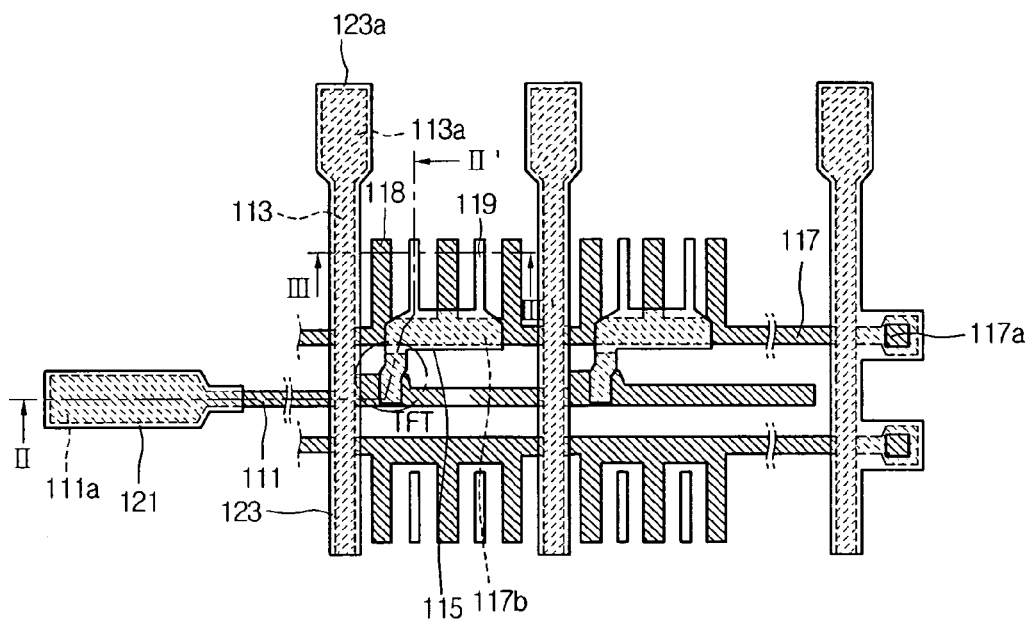
FIG. 3 is a plan view of an IPS mode LCD according to an embodiment of the present invention.

FIG. 3 is a plan view of an IPS mode LCD according to an embodiment of the present invention.

As shown in FIG. 3, a unit pixel region is defined by a gate line 111 and a data line which are arranged to cross each other. The gate line 111 receives a driving signal, and the data line includes a first data line 113 and a second data line 123 for receiving a data signal. The first data line 113 and the second data line 123 may overlap with each other.

The first data line 113 is an opaque metal and is formed when a channel layer is formed along a halftone pattern. The second data line 123 is a line patterned to overlap along the first data line 113 when a pixel electrode 119 is formed by depositing a transparent metal.

Therefore, the data line is a double-layered structure including the first data line 113 and the second data line 123.

A common line 117 is formed and is separated from the gate line 111 by a predetermined distance. A thin film transistor (TFT) is formed in a crossing region where the gate line 111 and the first and the second data lines 113 and 123 cross. The TFT may be a switching element.

A plurality of common electrodes 118 and a plurality of pixel electrodes 119 are branched in the form of a slit and alternately arranged to be separated from each other by a predetermined distance in the unit pixel region.

The common electrodes 118 are branched from a first storage electrode 117b into the unit pixel region and are parallel to the first data line 113 and the second data line 123. The first storage electrode 117b is integrally formed with the common line 117.

The pixel electrodes 119 are also branched from a second storage electrode 115 that overlaps with the first storage electrode 117b and is formed over the first storage electrode 117b.

Because the pixel electrode 119 is formed by performing three mask processes in an exemplary embodiment of the present invention, the first storage electrode 117b extends to a drain electrode region of a thin film transistor and is electrically connects to the drain electrode.

The drain electrode of the thin film transistor may be formed of two electrode layers, similar to the first data line 113 and the second data line 123.

A gate pad 111a is formed at an edge of the gate line 111. A gate contact pad 121 made of a transparent metal is formed on the gate pad 111a.

A first data pad 113a is formed at an edge of the first data line 113, and a second data line 123a made of a transparent metal is formed to overlap with the first data pad 113a. The second data pad 123a of the second data line 123, which overlaps with the first data line 113, is formed on the first data pad 113a as a contact pad. A reference numeral 117a denotes a common pad.

As described above, the number of processes used to manufacture an LCD is reduced to three mask processes while obtaining a storage capacitance Cst according to the present embodiment.

Figure 4A:
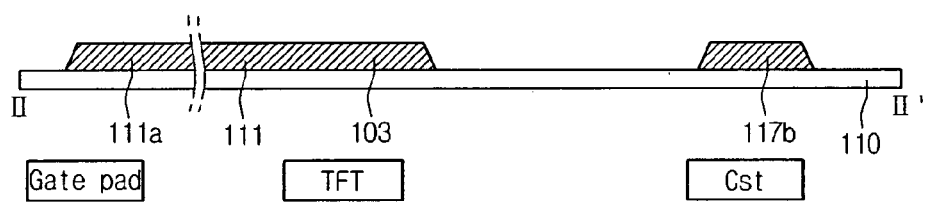
FIG. 4A is a sectional view of FIG. 3 taken along a line II-II' for illustrating a first mask process.
Figure 4B:
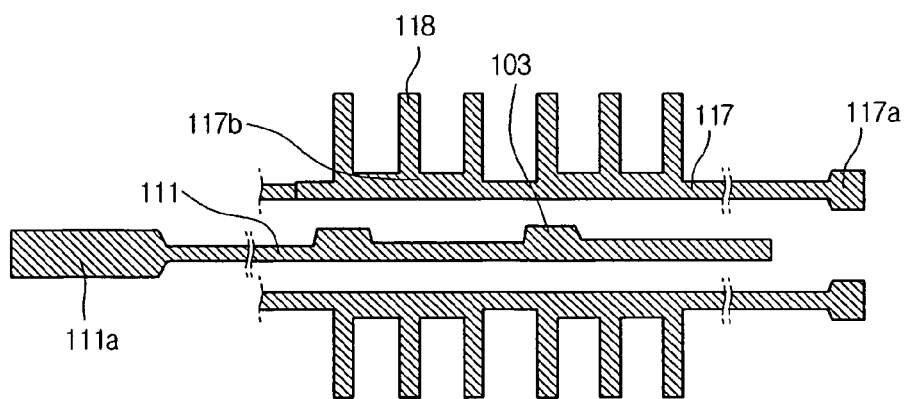
FIG. 4B is a plan view of FIG. 3 for illustrating a first mask process.

FIG. 4A is a sectional view of FIG. 3 taken along a line II-II', and FIG. 4B is a plan view of FIG. 3 for illustrating a first mask process according to an embodiment of the present invention.

As shown in FIG. 4A, in the first mask process according to the present embodiment, a metal layer is deposited on an insulation substrate 110. The metal layer is patterned by a photolithography process, and an etching process is performed to simultaneously form the gate line 111, the gate pad 111a, the gate electrode 103 and the common line 117.

As shown in FIG. 4B, the common line 117 is used as the first storage electrode 117b to form a storage capacitance Cst in a unit pixel region.

The gate line 111 is formed on the insulation substrate 110. The common line 117 is formed to be parallel to the gate line 111. A plurality of common electrodes 118 branch from the first storage electrode 117b that is integrally formed with the common line 117. A reference numeral 117a is a common pad.

Figure 5:
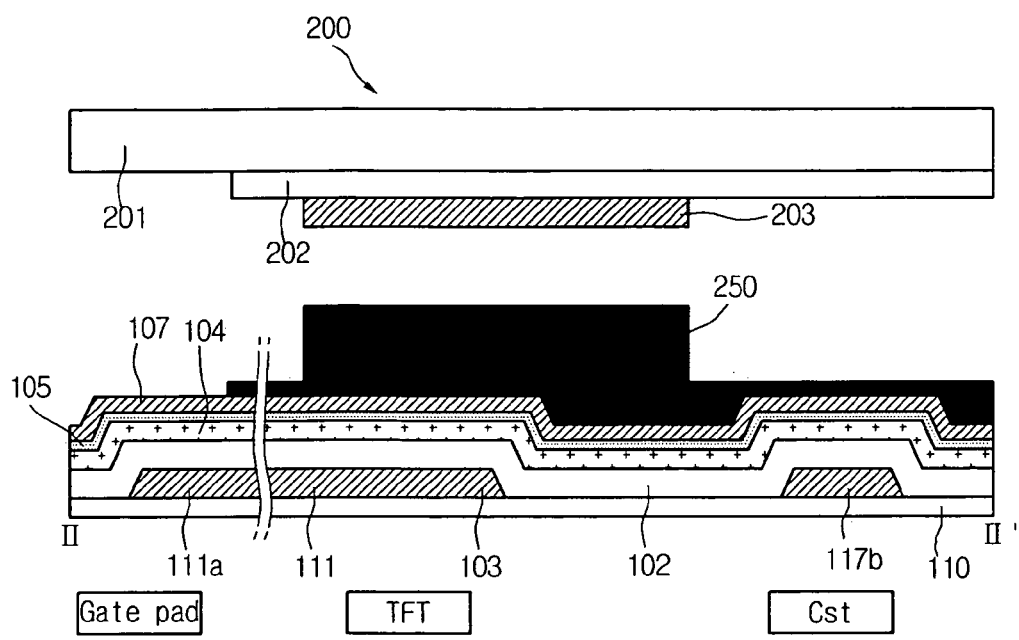
FIG. 5 is a sectional view of FIG. 3 taken along a line II-II' for illustrating part of a second mask process.

When the gate line 111 is formed, a second mask process is performed as shown in FIG. 5.

FIG. 5 is a sectional view of FIG. 3 taken along a line II-II' for illustrating a patterning process of a photoresist in a second mask process. As shown, a gate insulating layer 102, an amorphous silicon layer 104, a doped amorphous silicon layer 105 and a metal layer 107 are sequentially formed on the entire surface of the insulation substrate 110.

Then, a photoresist is coated on the insulation substrate 110, and an exposure process is performed using a halftone mask 200. The halftone mask 200 includes a full transmission layer 201, a semi-transmission layer 202 and a non-transmission layer 203.

When the exposed photoresist is developed after using the halftone mask 200, a halftone pattern 250 is formed on the insulation substrate 110.

The halftone pattern 250 includes a fully exposed region corresponding to the fully transmission layer 201 where none of the photoresist remains, a semi-exposed region corresponding to the semi-transmission layer 202 where a thin photoresist pattern remains and a non-exposed region corresponding to the non-transmission layer 203 where all of the photoresist remains. In the semi-exposed region, the photoresist has a thinner pattern compared to the pattern of photoresist in the non-exposed region.

Figure 6:
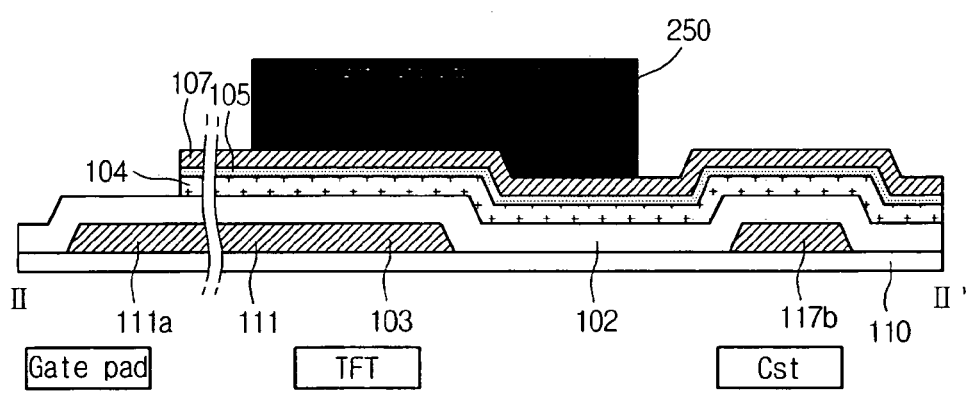
FIG. 6 is a sectional view of FIG. 3 taken along a line II-II' for illustrating part of a second mask process.

After forming the halftone pattern 250 on the insulation substrate 110, etching processes are sequentially performed as shown in FIGS. 6, 7A and 7B.

FIG. 6 is a sectional view of FIG. 3 taken along a line II-II' for illustrating a first etching process in a second mask process. FIGS. 7A and 7B are a cross-section view of FIG. 3 taken along a line II-II' and a plan view of FIG. 3 for illustrating a second etching process in a second mask process.

As shown in FIG. 6, a fully exposed region, which is the gate pad region in FIG. 6, is etched using the halftone pattern 250 formed on the insulation substrate 110 to sequentially etch the metal layer 107, the doped amorphous silicon layer 105 and the amorphous silicon layer 104. While etching the fully exposed region, the photoresist on the semi-exposed region is removed.

Then, a second etching process is performed along the remaining halftone pattern 250 on the insulation substrate 110 to sequentially etch the metal layer 107, the doped amorphous silicon layer 105 and the amorphous silicon layer 104. As a result, the first data line 113, the first drain electrode 114 and the channel layer 104a are simultaneously formed.

The channel layer 104a is formed on the non-exposed region by performing the second etching process along the halftone pattern 250, the doped amorphous silicon layer 105, the first data line 113 and the first drain electrode 114 on the channel layer 104a.

FIG. 7B shows a pattern formed on the insulation substrate 110 after the etching process of FIG. 7A. The first data line 113 in the channel layer 104a is a source electrode and the first data line 113 is electrically connected to a first drain electrode 114.

The first data line 113 crosses the gate line 111 to define a unit pixel region. The first drain electrode 114 is formed to connect to the first data line 113 at a crossing region where the gate line 111 and the first data line 113 cross. A reference numeral 113a denotes a first data pad.

The first etching process also removes a gate insulating layer 102 formed on the gate pad 111a and the common pad 117a. Accordingly, the gate pad 111a and the common pad 117a are opened. Therefore, the gate insulating layer 102 remains on the insulation substrate 110 except in regions of the gate pad 111a and the common pad 117a.

After performing the second mask process, a third mask process is performed as shown in FIGS. 8, 9, 10A and 10B.

Figure 8:
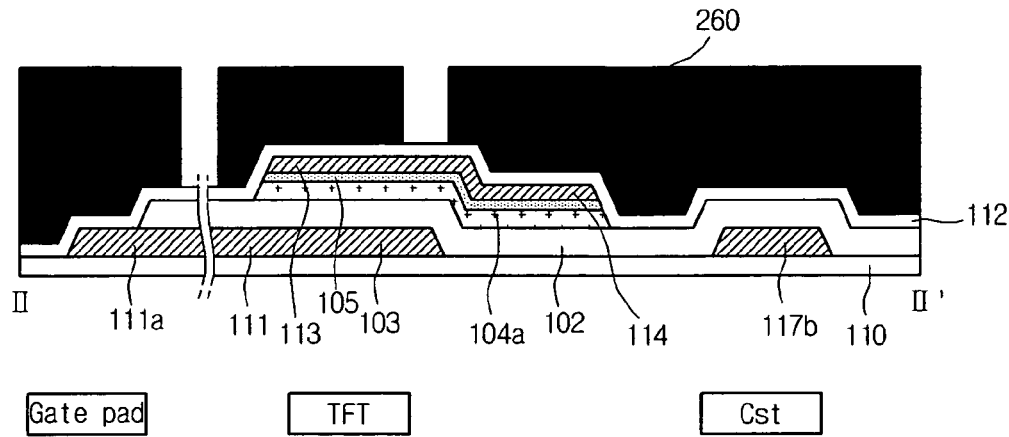
FIG. 8 is a cross sectional view of FIG. 3 taken along a line II-II' for illustrating part of a third mask process.
Figure 9:
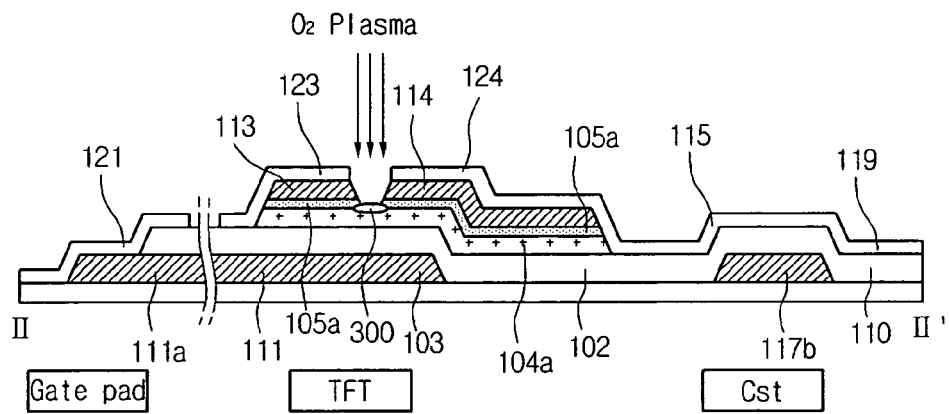
FIG. 9 is a cross sectional view of FIG. 3 taken along a line II-II' for illustrating part of a third mask process.
Figure 10A:
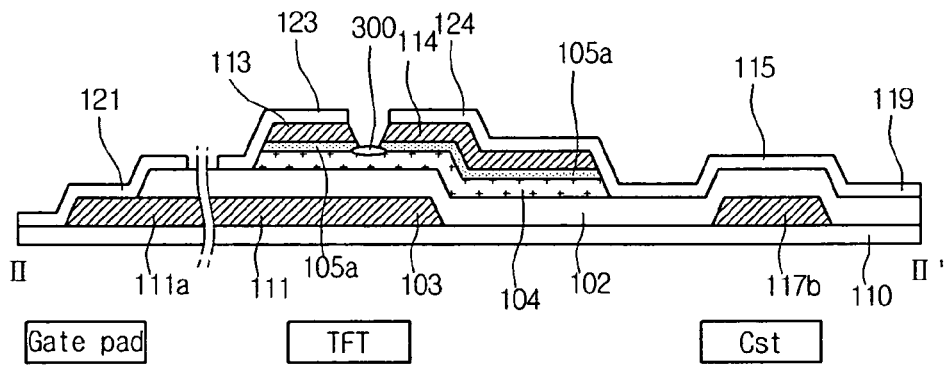
FIGS. 10A and 10B are a plan view and a sectional view of FIG. 3 taken along line II-II' for illustrating a plasma process.
Figure 10B:
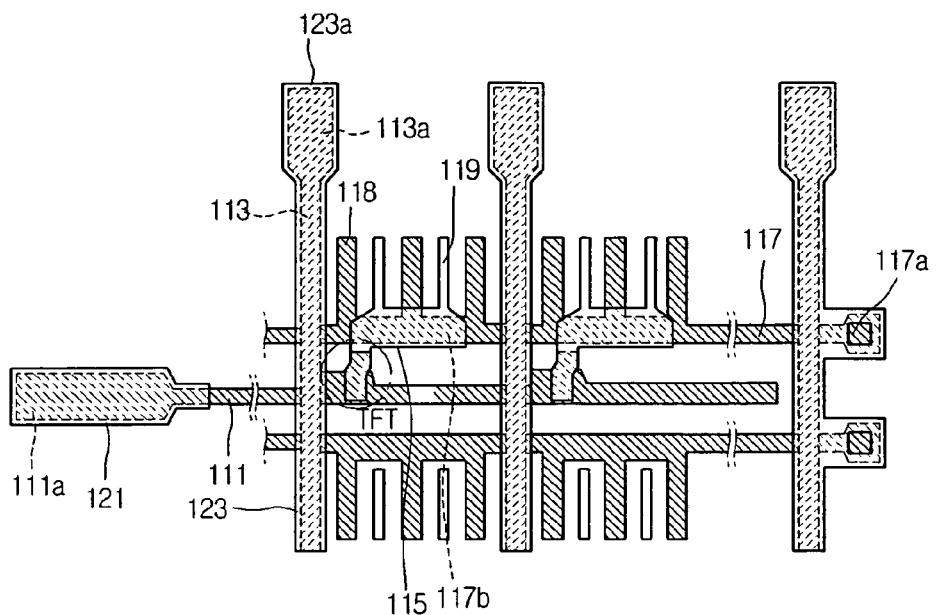

FIG. 8 is a cross sectional view of FIG. 3 taken along a line II-II' for illustrating a patterning process of a photoresist in a third mask process. FIG. 9 is a cross sectional view of FIG. 3 taken along a line II-II' for illustrating a plasma process after etching in a third mask process. FIGS. 10A and 10B are a plan view and a sectional view of FIG. 3 taken along line II-II' for illustrating a plasma process.

As shown in FIG. 8, the remaining halftone pattern 250 on the insulation substrate 110 is removed, and an ITO transparent layer 112 is deposited on an entire surface of the insulation substrate 110.

A photoresist is coated on insulation substrate 110 where the ITO transparent metal layer 112 is deposited. The photoresist is patterned by an exposing process and a developing process to form patterned photoresist 260.

As shown in FIG. 9, an etching process is performed along the patterned photoresist 260 to form a second data line 123 made of a transparent metal and a second drain electrode 124.

In the pixel region, a second storage electrode integrally formed with the second drain electrode 124 is formed. A pixel electrode 119 is also formed.

The etching process is performed on a region of the channel layer 104a between the second data line 123 and the second drain electrode 124 to separate the first data line 113 and the first drain electrode 114.

A separating region between the second data line 123 and the second drain electrode 124 is etched to form an ohmic contact layer 105a. Simultaneously, and the channel layer 104a is opened. The transparent metal layer in the gate pad 111a is etched to form a gate contact pad 121.

Accordingly, the first data line 113 and the second data line 123 overlap each other while contacting each other. The first data line 113 and the second data line 123 may be used as the first source electrode 113 and the second source electrode 123 in a region facing the first drain electrode 114 and the second drain electrode 124.

The first source electrode 113, which is the first data line, is made of a non-transparent metal such as Al, Mo, or a compound metal thereof. The second source electrode 123, which is the second data line, may be made of a transparent metal and overlaps with the first source electrode 113 over the first source electrode 113.

The first drain electrode 114 is made of a non-transparent metal such as Al, Mo or a compound metal thereof, and the second drain electrode 124 is made of a transparent metal and overlaps with the first drain electrode 114 over the first drain electrode 114.

The second drain electrode 124, the second storage electrode 115 and the pixel electrode 119 are integrally connected.

After opening the region of the channel layer 104a, a passivation layer 300 is formed on the channel layer 104a of the thin film transistor using an $O_2$ plasma process. The $O_2$ plasma reacts with a silicon (Si) component of the channel layer 104a to form the passivation layer 300, that includes $SiO_x$, on the externally exposed channel layer 104a.

A method of locally depositing the $O_2$ plasma to form a passivation layer at a deposited region is disclosed in the Journal of Applied Physics, Vol. 84, November 7, pp. 3933-3999 (1998).

The LCD is manufactured according to the present embodiment without performing additional mask processes after depositing a passivation layer using the $O_2$ plasma process disclosed in the Journal of Applied Physics.

The passivation layer 300 may be formed before or after stripping a patterned photoresist for the thin film transistor.

The passivation layer 300 prevents penetration of impurities in the channel layer 104a when forming an alignment layer after the photoresist stripping process. Thus, the passivation layer 300 is formed to protect the characteristics of the thin film transistor.

After forming the passivation layer 300 on the channel layer 104a, the stripping process is performed to remove the patterned photoresist 260. The passivation layer 300 protects the channel layer 104a from being damaged by the stripping process.

Referring to FIG. 10B, the second data line 123 made of a transparent metal overlaps with the first data line 113, and the first data pad 113a of the first line 113 contacts the second data pad 123a of the second data line 123. Therefore, the second data pad 123a is used as a data contact pad of the first data pad 113a.

The second drain electrode 124 overlaps with the first drain electrode 114, and the gate contact pad 121 is formed on the gate pad 111a.

According to the present invention, the LCD is manufactured using only three mask processes without performing an additional passivation forming process. Therefore, the manufacturing process of the LCD is simplified.

Furthermore, because the gate insulating layer 102 exists only between the first storage electrode 117b and the second storage electrode 115, a greater storage capacitance Cst is obtained compared to the related art storage capacitance of an LCD manufactured by four mask processes.

Figure 11:
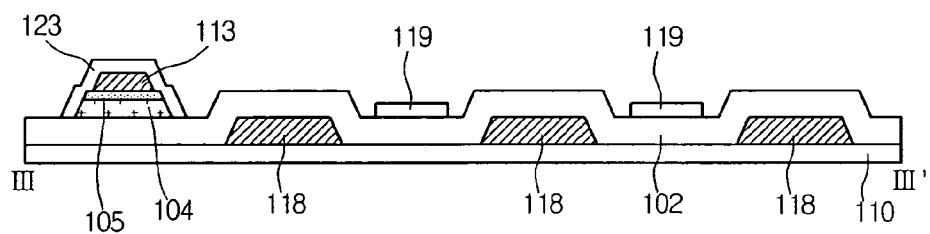
FIG. 11 is a cross section view of FIG. 3 taken along a line III-III'.

FIG. 11 is a cross section view of FIG. 3 taken along a line III-III'.

As shown in FIG. 11, the common electrodes 118 are spaced apart by a predetermined distance on the insulation substrate 110. The pixel electrodes 119 are arranged on and alternately with the common electrode 118 while the gate insulating layer 102 is interposed between the common electrode 118 and the pixel electrode 119.

At one side of the common electrode 118, the first data line 113 and the second data line 123 are disposed. The amorphous silicon layer 104 and the doped amorphous silicon layer 105 remain between the first data line 113 and the gate insulating layer 102 because the first data line 113 and the second data line 123 are simultaneously formed along the halftone mask 200.

The first data line 113 and the second data line 123 are electrically connected. The second data line 123 may be made of an ITO transparent metal which is the same metal used for the pixel electrode 119.

After the first data line 113 is patterned, the second data line 123 is formed by patterning the transparent metal along the first data line 113.

Therefore, the method of manufacturing an LCD according to the present invention reduces the number of times of performing mask processes while obtaining the storage capacitance. As a result, a display quality of the LCD is improved.

As described above, in the method of manufacturing an LCD according to the present invention, the number of times of performing mask processes is reduced while obtaining the storage capacitance Cst. Also, light leakage defects caused by the step difference are prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing an LCD (liquid crystal display device), comprising:
    a first mask operation for forming a gate line, a gate pad, a gate electrode and a common line on an insulation substrate;
    a second mask operation for sequentially forming a gate insulating layer, an amorphous silicon layer, a doped amorphous silicon layer and a metal layer on the insulation substrate where the gate electrode is formed, and forming a data line and a channel layer through a halftone process;
    a third mask operation for forming a transparent metal layer on the insulation substrate where the channel layer is formed, and simultaneously forming a contact pad, a second data line, an electrode of a thin film transistor, an ohmic contact layer and a pixel electrode through an etching process; and
    a plasma process for forming a passivation layer on the channel layer of the thin film transistor.

2. The method according to claim 1, wherein in the first mask process, a first storage electrode is formed.

3. The method according to claim 2, wherein in the third mask process, a second storage electrode is formed to be overlapped with the first storage electrode while interposing a gate insulating layer between the first storage electrode and the second storage electrode.

4. The method according to claim 2, wherein the first storage electrode is integrally formed with the common line.

5. The method according to claim 1, wherein the electrode of the thin film transistor is formed as a first source electrode, a second source electrode, a first drain electrode and a second drain electrode.

6. The method according to claim 5, wherein the first source electrode and the second source electrode are the first data line and the second data line.

7. The method according to claim 5, wherein the first drain electrode and the second drain electrode are contacted each other to be overlapped.

8. The method according to claim 5, wherein the second drain electrode is integrally formed with the second storage electrode and the pixel electrode.

9. The method according to claim 5, wherein the second data line, the second drain electrode, the second storage electrode and the pixel electrode are formed of transparent metal.

10. The method according to claim 1, wherein the plasma is oxygen component.

11. The method according to claim 1, wherein the passivation layer is $SiN_x$ formed through reacting the plasma and the components of the channel layer.

12. The method according to claim 1, wherein in the plasma process, an etching process is performed along a halftone pattern, and the plasma process is performed before a stripping a patterened photoresist for the thin film transistor.

13. The method according to claim 1, wherein in the plasma process, an etching process is performed along a halftone pattern, and the plasma process is performed after stripping a patterned photoresist for the thin film transistor.

14. The method according to claim 1, wherein the passivation layer formed on the channel layer protects characteristics of a thin film transistor.

* * * * *